(12) United States Patent
Mitchell et al.

(10) Patent No.: US 9,710,124 B2
(45) Date of Patent: Jul. 18, 2017

(54) AUGMENTING USER INTERFACE ELEMENTS BASED ON TIMING INFORMATION

(75) Inventors: April Slayden Mitchell, San Jose, CA (US); Glenn A Wong, Foster City, CA (US); Susie Wee, Palo Alto, CA (US); Mark C Solomon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 468 days.

(21) Appl. No.: 14/007,513

(22) PCT Filed: Mar. 31, 2011

(86) PCT No.: PCT/US2011/030727
§ 371 (c)(1),
(2), (4) Date: Sep. 25, 2013

(87) PCT Pub. No.: WO2012/134479
PCT Pub. Date: Oct. 4, 2012

(65) Prior Publication Data
US 2014/0019894 A1  Jan. 16, 2014

(51) Int. Cl.
*G06F 3/0481* (2013.01)
*G09G 5/14* (2006.01)
(Continued)

(52) U.S. Cl.
CPC ........ *G06F 3/0481* (2013.01); *G06F 3/04817* (2013.01); *G06Q 10/101* (2013.01); *G09G 5/14* (2013.01); *G06F 3/04845* (2013.01)

(58) Field of Classification Search
CPC .. G06F 3/0484; G06F 3/04845; G06F 3/1446; G06F 3/0481; G06F 3/04817; G06Q 10/101; G09G 5/01; G09G 5/14
See application file for complete search history.

(56) References Cited

U.S. PATENT DOCUMENTS

| 5,564,004 A | * | 10/1996 | Grossman | ............. G06F 3/0481 715/811 |
| 5,801,699 A | * | 9/1998 | Hocker | ............... G06F 3/04817 715/781 |

(Continued)

FOREIGN PATENT DOCUMENTS

| CN | 101604224 A | 12/2009 |
| CN | 101833418 A | 9/2010 |
| JP | 2003131779 A | 5/2003 |

OTHER PUBLICATIONS

Agarawala, Anand, and Ravin Balakrishnan. "Keepin' it real: pushing the desktop metaphor with physics, piles and the pen." Proceedings of the SIGCHI conference on Human Factors in computing systems. ACM, 2006.*

(Continued)

*Primary Examiner* — Eric Wiener
(74) *Attorney, Agent, or Firm* — HP Patent Department

(57) ABSTRACT

An example method includes determining a region of interest of an interactive display. The method also includes determining a time since utilization of a user interface element exceeds a threshold. The method includes determining timing information for content in a region of the interactive display other than the region of interest, determining the content is stale based on the timing information exceeding a threshold, and removing the content from the interactive display based on the content being stale. The method includes automatically moving the user interface element progressively over a period of time from an initial location to the region other than the region of interest. The method further includes providing another user interface element capable of selecting a previous time since utilization, receiving input selecting the previous time since utilization, and moving the user interface element to a historic location associated with the previous time since utilization.

14 Claims, 6 Drawing Sheets

(51) Int. Cl.
*G06Q 10/10* (2012.01)
*G06F 3/0484* (2013.01)

(56) References Cited

U.S. PATENT DOCUMENTS

| | | | | |
|---|---|---|---|---|
| 5,859,639 | A * | 1/1999 | Ebrahim | G06F 3/0481 |
| | | | | 715/788 |
| 5,920,313 | A * | 7/1999 | Diedrichsen | G06F 3/0481 |
| | | | | 715/767 |
| 6,281,897 | B1 * | 8/2001 | Berry | G06F 3/0481 |
| | | | | 715/784 |
| 6,332,147 | B1 | 12/2001 | Moran et al. | |
| 6,353,451 | B1 * | 3/2002 | Teibel | G09G 5/14 |
| | | | | 715/764 |
| 6,473,102 | B1 | 10/2002 | Rodden et al. | |
| 6,573,913 | B1 * | 6/2003 | Butler | G06F 3/1423 |
| | | | | 345/1.1 |
| 6,710,790 | B1 * | 3/2004 | Fagioli | G06F 3/0481 |
| | | | | 715/778 |
| 6,714,222 | B1 * | 3/2004 | Bjorn | G06F 3/0481 |
| | | | | 715/773 |
| 6,750,890 | B1 * | 6/2004 | Sugimoto | G06T 1/00 |
| | | | | 345/594 |
| 7,062,497 | B2 * | 6/2006 | Hamburg | G06F 17/24 |
| 7,242,389 | B1 | 7/2007 | Stern | |
| 7,284,209 | B2 * | 10/2007 | Jones | G06F 3/0482 |
| | | | | 345/520 |
| 7,370,284 | B2 * | 5/2008 | Andrea | G06F 3/0481 |
| | | | | 715/788 |
| 8,214,760 | B2 * | 7/2012 | Matthews | G06F 3/0481 |
| | | | | 715/795 |
| 8,555,193 | B2 * | 10/2013 | Sar | G06F 9/4443 |
| | | | | 715/764 |
| 9,037,997 | B2 * | 5/2015 | Ording | G06F 3/0481 |
| | | | | 715/790 |
| 9,342,208 | B2 * | 5/2016 | Howes | G06F 3/0481 |
| 2002/0186212 | A1 * | 12/2002 | Matsumoto | G06F 3/14 |
| | | | | 345/204 |
| 2003/0234772 | A1 | 12/2003 | Zhang et al. | |
| 2004/0261037 | A1 * | 12/2004 | Ording | G06F 3/0481 |
| | | | | 715/788 |
| 2005/0125736 | A1 * | 6/2005 | Ferri | G06F 3/0481 |
| | | | | 715/747 |
| 2006/0020902 | A1 | 1/2006 | Tabi | |
| 2006/0242602 | A1 * | 10/2006 | Schechter | G06F 9/4443 |
| | | | | 715/838 |
| 2006/0259923 | A1 | 11/2006 | Chiu | |
| 2007/0085854 | A1 * | 4/2007 | Zimmer | G06F 9/4443 |
| | | | | 345/582 |
| 2007/0188518 | A1 * | 8/2007 | Vale | G06F 3/04883 |
| | | | | 345/619 |
| 2007/0192722 | A1 | 8/2007 | Kokubo | |
| 2007/0271524 | A1 * | 11/2007 | Chiu | G06F 17/30058 |
| | | | | 715/767 |
| 2008/0034320 | A1 * | 2/2008 | Ben-Shachar | G06F 3/1454 |
| | | | | 715/790 |
| 2008/0052742 | A1 * | 2/2008 | Kopf | H04N 5/44591 |
| | | | | 725/34 |
| 2008/0307359 | A1 * | 12/2008 | Louch | G06F 3/0481 |
| | | | | 715/835 |
| 2008/0307362 | A1 * | 12/2008 | Chaudhri | G06F 3/0481 |
| | | | | 715/835 |
| 2009/0094555 | A1 * | 4/2009 | Viitala | H04M 1/72544 |
| | | | | 715/838 |
| 2009/0096810 | A1 * | 4/2009 | Green | G06F 3/1454 |
| | | | | 345/620 |
| 2009/0100343 | A1 * | 4/2009 | Lee | G06Q 10/10 |
| | | | | 715/733 |
| 2009/0307623 | A1 * | 12/2009 | Agarawala | G06F 3/0483 |
| | | | | 715/765 |
| 2010/0064007 | A1 | 3/2010 | Randall | |
| 2010/0169828 | A1 * | 7/2010 | Kho | G06F 9/4443 |
| | | | | 715/810 |
| 2010/0245563 | A1 | 9/2010 | Golovchinsky et al. | |
| 2010/0313124 | A1 * | 12/2010 | Privault | G06F 3/0488 |
| | | | | 715/702 |
| 2011/0078624 | A1 * | 3/2011 | Missig | G06F 3/04883 |
| | | | | 715/802 |
| 2011/0164054 | A1 * | 7/2011 | Murakami | G06F 3/0481 |
| | | | | 345/635 |
| 2012/0005587 | A1 * | 1/2012 | Martin | G06F 3/1454 |
| | | | | 715/740 |
| 2012/0216114 | A1 * | 8/2012 | Privault | G06F 3/04883 |
| | | | | 715/702 |
| 2012/0240044 | A1 * | 9/2012 | Johnson | G06F 3/0481 |
| | | | | 715/716 |
| 2013/0055124 | A1 | 2/2013 | Wang | |
| 2013/0120439 | A1 * | 5/2013 | Harris | G11B 27/034 |
| | | | | 345/619 |

OTHER PUBLICATIONS

Hancock, Mark, Thomas Ten Cate, and Sheelagh Carpendale. "Sticky tools: full 6DOF force-based interaction for multi-touch tables." Proceedings of the ACM International Conference on Interactive Tabletops and Surfaces. ACM, 2009.*

Ståhl, Olov, et al. "Information exploration using the pond." Proceedings of the 4th international conference on Collaborative virtual environments. ACM, 2002.*

Isenberg, Petra, et al. "Digital tables for collaborative information exploration." Tabletops-Horizontal Interactive Displays. Springer London, 2010. 387-405.*

Scott, Stacey D., Karen D. Grant, and Regan L. Mandryk. "System guidelines for co-located, collaborative work on a tabletop display." ECSCW 2003. Springer Netherlands, 2003.*

Vogel, Daniel, and Ravin Balakrishnan. "Interactive public ambient displays: transitioning from implicit to explicit, public to personal, interaction with multiple users." Proceedings of the 17th annual ACM symposium on User interface software and technology. ACM, 2004. 113 pages.*

Guimbretièere, François, Maureen Stone, and Terry Winograd. "Fluid interaction with high-resolution wall-size displays." Proceedings of the 14th annual ACM symposium on User interface software and technology. ACM, 2001.*

Marquardt, Nicolai, et al. "The continuous interaction space: interaction techniques unifying touch and gesture on and above a digital surface." Human-Computer Interaction-Interact 2011. Springer Berlin Heidelberg, 2011. 461-476.*

Mander, Richard, Gitta Salomon, and Yin Yin Wong. "A "pile" metaphor for supporting casual organization of information." Proceedings of the SIGCHI conference on Human factors in computing systems. ACM, 1992.*

Conversy, Stéephane, et al. "Supporting air traffic control collaboration with a TableTop system." Proceedings of the ACM 2011 conference on Computer supported cooperative work. ACM, 2011.*

Liu, Jun, et al. "TNT: improved rotation and translation on digital tables." Proceedings of Graphics interface 2006. Canadian Information Processing Society, 2006.*

International Searching Authority, International Search Report and Written Opinion for PCT/US2011/030727, filed Mar. 31, 2011, Date mailed May 1, 2012.

Mark Apperley,et al,Use of Video Shadow for Small Group Interaction Awareness on a Large Interactive Display Surface,http://portal.acm.org/citation.cfm?id=820086.820107 ,2002.

Norbert A. Streitz, et al, Dolphin: Integrated Meeting Support Across Liveboards. Local and Remote Desktop Environments,http://citeseerx.ist.psu.edu/viewdoc/summary:jsessionid=9402AB1ACC9B309090964825D571AAF2?doi=10.1.1.45.2135 > Publication Date: 1994.

* cited by examiner

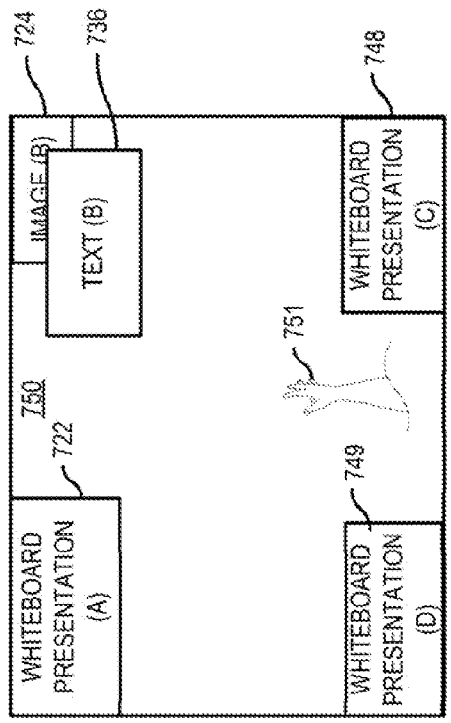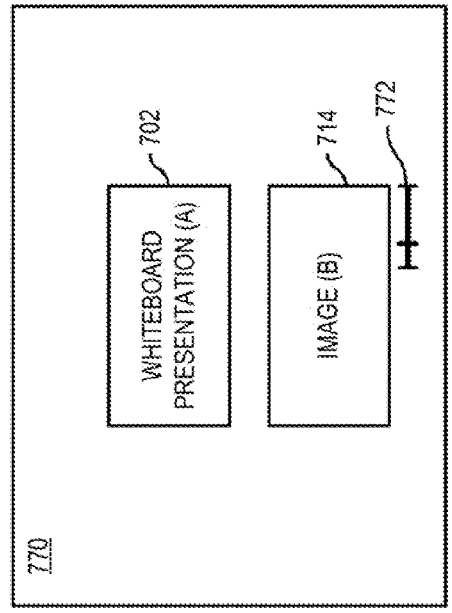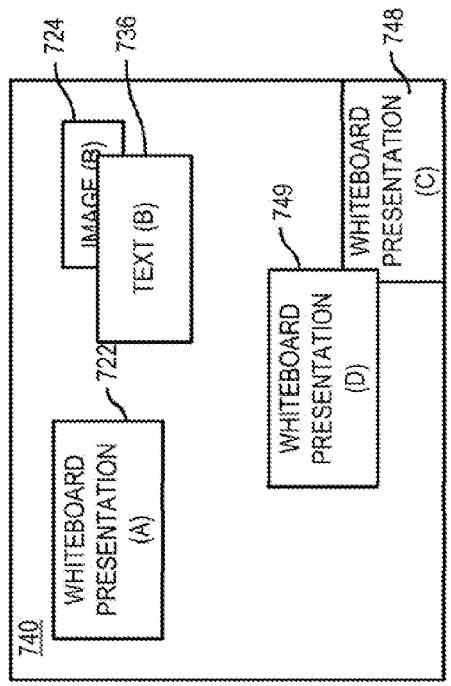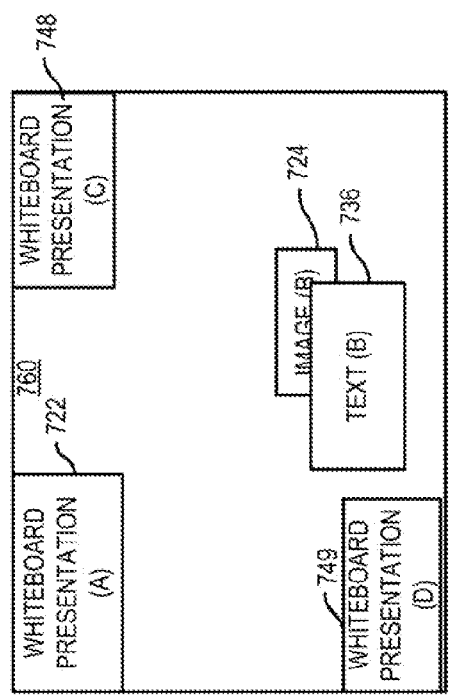

AUGMENTING USER INTERFACE ELEMENTS BASED ON TIMING INFORMATION

BACKGROUND

Large interactive displays may be geared towards various users. Further, a large interactive display can include one or more displays or presentation devices such as a monitor or multiple monitors. Device manufacturers of such large interactive displays are challenged to provide new and compelling user experiences for users of the large interactive displays. These user experiences can be developed for single users of the large interactive displays or multiple users of the large interactive displays.

BRIEF DESCRIPTION OF THE DRAWINGS

The following detailed description references the drawings, wherein:

FIGS. 7A-7H are block diagrams of example user interfaces for augmenting user interface elements, according to various examples.

DETAILED DESCRIPTION

Figure 1:
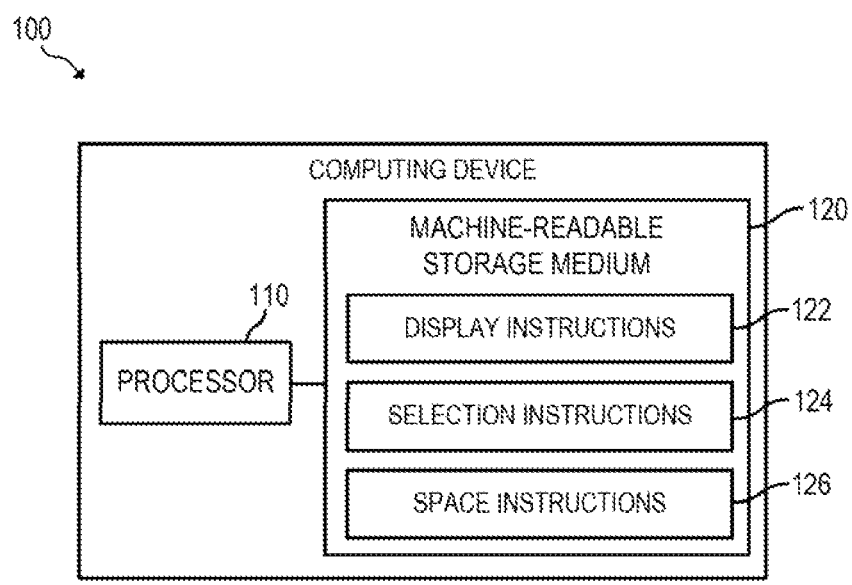
FIG. 1 is a block diagram of a computing device for augmenting user interface elements, according to one example.

Large Interactive Displays (LIDs) are growing as a mechanism to provide content to users. LIDs can be utilized to present content to users in a building lobby (e.g., a directory, a map, etc.), during a meeting (e.g., agenda, attendees, etc.), or in a classroom (e.g., as a whiteboard). As such, LIDs can be used as a multi-user interface to generate content via user interactions with the interface. One user can utilize the user interface or many users can utilize the user interface concurrently.

In certain examples, a LID can be a device or system including multiple devices that allows for user input to be received from one or more users and content to be presented simultaneously to the users. In certain embodiments, a large interactive display is a display large enough to allow multiple users to interact with it at the same time. Further, in certain embodiments, LIDs have large display surfaces, which can be a single large display, a number of tiled smaller displays, or the like. Large interactive displays can include interactive projection displays (e.g., a display to a projection screen or wall), liquid crystal displays (LCDs), etc. Examples of ways to interact with a LID are via a touch mechanism, such as pointing via a finger, a pen or stylus mechanism, multi-touch enabled input, an audible input mechanism (e.g., voice), and a gesture mechanism.

LID uses, such as interactive brainstorming sessions can carry over into multi-day discussions and may involve content from a variety of different areas. Further, a user of the LID may want to continue to utilize space available on the LID while brainstorming. However, even though there is space available on the LID, the user may not be within interaction reach of the free space (e.g., if the user is utilizing a workspace of the LID that is within a touch distance).

Accordingly, various embodiments disclosed herein relate to augmenting one or more user interface elements displayed on the LID to provide free workspace for a user. By way of example, user interface elements can include images, text (e.g., text based on one or more fonts), windows, menus, icons, controls, widgets, tabs, cursors, etc. Further, some user interface elements (e.g., a window) can include other user interface elements (e.g., images, text, etc.).

An approach to free workspace is by augmenting the user interface elements by moving a user interface element in a region actively being used by the user or recently used by the user to another portion of the LID based on timing information. In certain embodiments, timing information is a measurement that tracks time. For example, timing information can be generated and/or stored by a processor based counting mechanism, a timer, a clock, or the like. Further, the timing information can be associated with the user interface element upon its creation. As time moves forward, the location of the user interface element can be incrementally moved to another region of the LID. The region can be a free workspace, such as an unused corner, side, or border of the LID, a used workspace that has become stale, a background layer of a presentation displayed on the LID, or the like. Moreover, one or more regions of the LID can be associated with one or more topics (e.g., one or more categories, keyword, sets of keywords or tags, etc.). The user interface element or a group of user interface elements can additionally be associated with one or more topics. As such, as time moves forward, the user interface element(s) can move towards a region associated with the respective topic (s). Because user interface elements are moved towards other spaces, the region that the user is accessing remains free for the user to create additional content.

FIG. 1 is a block diagram of a computing device for augmenting user interface elements, according to one example. The computing device 100 includes, for example, a processor 110, and a machine-readable storage medium 120 including instructions 122, 124, 126 for augmenting a location of a user interface element as a function of time. Computing device 100 may be, for example, a notebook computer, a tablet computing device, a portable reading device, a wireless email device, a mobile phone, a server, a desktop computer, or any other computing device. The computing device 100 may further be coupled to a LID that can be utilized to display information including the user interface elements.

Processor 110 may be, at least one central processing unit (CPU), at least one semiconductor-based microprocessor, at least one graphics processing unit (GPU), other hardware devices suitable for retrieval and execution of instructions stored in machine-readable storage medium 120, or combinations thereof. For example, the processor 110 may include multiple cores on a chip, include multiple cores across multiple chips, multiple cores across multiple devices (e.g., if the computing device 100 includes multiple node devices), or combinations thereof. Processor 110 may fetch, decode, and execute instructions 122, 124, 126 to implement, for example, the processes of FIGS. 3-6. As an alternative or in addition to retrieving and executing instructions, processor 110 may include at least one integrated circuit (IC), other control logic, other electronic circuits, or combinations thereof that include a number of electronic components for performing the functionality of instructions 122, 124, 126.

Machine-readable storage medium 120 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail below, machine-readable storage medium 120 may be encoded with a series of executable instructions for performing the processes of FIGS. 3-6 as well as providing other functionality. As such, the instructions can be used to augment a location of one or more user interface elements presented on a display.

Display instructions 122 can be executed by the processor 110 to cause a presentation on a display, such as a LID. The display instructions 122 can be a part of a program (e.g., an operating system, a driver, an application, etc.) or multiple programs. For example, the display can include presentation of a desktop as well as one or more user interface elements. The user interface elements can be tied to one or more programs.

In one example, a program presented on the LID is a content presentation and/or usage program such as a whiteboard program or operating system desktop. The program can be utilized to allow a user to generate and/or load content. By way of example, content can include images (e.g., vector drawings, photographs, etc.), video, text, audio, lines, highlighting, other information that can be presented on the LID, or the like. Content can be generated via input from a user, loaded from memory, received from another device, or the like. The display instructions 122 cause the processor 110 to send the signal to present the generated content on the LID.

The display instructions 122 can further be used to determine a region of interest associated with the LID. The region of interest can be determined based on a determination that a user or multiple users are using the region. In certain embodiments, a region of interest includes a space or area on the LID that a user is likely to be using. The determination of the region of interest can be based on a usage pattern of the user(s). Further, the region of interest can be based on a placement of the user in association with the LID. This may be determined by analyzing one or more sensor inputs to the processor 110.

A usage pattern may be, for example, an area around which a portion of the LID has recently included an interaction, which can be determined using the sensor information and/or using input directed towards that portion of the LID. The pattern may further be associated with a particular user, for example, via a user profile. Thus, the size of the region can be dynamically dependent on the user. For example, if a particular user is associated with a previous usage pattern of generating content on the whiteboard from the left to the right, the region of interest determined to include generated content in the vicinity from the current usage of the LID skewed towards the right, an anticipated direction the user is utilizing the LID. Various shapes can be utilized to determine the region, including irregular shapes. Such shapes may include, for example, an ellipse, circle, rectangle, etc. Moreover, the region can be defined using one or more particular threshold distances (e.g., distances based on pattern information) from a current use location to determine the region.

In one example, a user profile or other configuration file can be utilized to define a field of reach for one or more users. The field of reach can be determined for a particular user and/or defined for multiple users (e.g., as a default setting). Further, the field of reach can be utilized to determine the region of interest without a usage pattern or an analysis based on sensor information. For example, a person's field of reach may be three to seven feet from the ground, creating a range from which touch input can be easily used.

The selection instructions 124 can then be utilized to determine a user interface element displayed on the LID. The user interface element can be presented in the region of interest. Moreover, the user interface element can include, for example, generated content such as a drawing, text, or the like. Further, the user interface element may be selected based on a determination that the user interface element is no longer being utilized by the user. In one scenario, the determination can be based on a time threshold. When the user interface element has not been used (e.g., based on timing information) for the time threshold, the user interface element is selected. The determination can be based on various starting points of timing information, for example, based on the last time the user interface element was used, the time the user interface element was created, etc.

Space instructions 126 may cause the processor 110 to augment a location associated with the user interface element as a function of time. With this approach, the user is able to utilize the space previously occupied by the user interface element. As such, the location of the user interface element can be incrementally moved to another region of the LID. Additionally or alternatively, the location of the user interface element can be incrementally faded into a background layer of the LID. As such, the augmentation can occur in three dimensions. In certain scenarios, the user interface element being augmented incrementally refers to the user interface element being modified based on an increase of time. The increments can be based on a count of timing information, on multiple counts, or the like.

Further, augmenting the user interface element as a function of time can include moving or fading the location of the user interface element linearly to time, exponentially using the time, parabolic to time, or any other function in relation to time. Moreover, other factors can be added to the function. In one example, the function can be caused to stop when the user interface element reaches a particular region of the LID (e.g., a known end region). In another example, the user interface element can be caused to move off of the LID. When this occurs, the user interface element can be saved so as to be loaded later, if necessary. Further, information about the user interface element can be saved at other times. For example, when the user interface element is created, when the user interface element is first moved, or at another time, the position, size, time, etc. of the user interface element can be stored. The information can be utilized to restore the user interface element at a later time.

Additionally, the user interface element can be grouped (e.g., associated with a topic, a tag, a particular region, etc.). The end region can be associated with the group. In one example, the user interface element can be grouped with a "top left" corner end region tag. As such, the user interface element is moved towards the "top left" corner as a function of time. In another example, the user interface element can be grouped with a "history" topic. The "history" topic can be associated with a region in the bottom left portion of the LID. As such, the user interface element is moved towards the bottom left region of the LID. In a similar manner, the groups can be associated with background layers of the LID presentation. When being faded into the background or moved, the space instructions 126 can also cause further augmentation of the user interface element. For example, the user interface element can be glossed over, or otherwise marked to show that it is not the main focus of the presentation. Additionally or alternatively, the user interface element can be diminished in size or scaling to allow for additional space to be generated. As noted above, the user interface element can be text. In this case, the scaling can include changing a font size. In another example, the user interface element may include multiple user interface elements (e.g., text and a drawing). The user interface element can be scaled down together as a single object.

Figure 2:
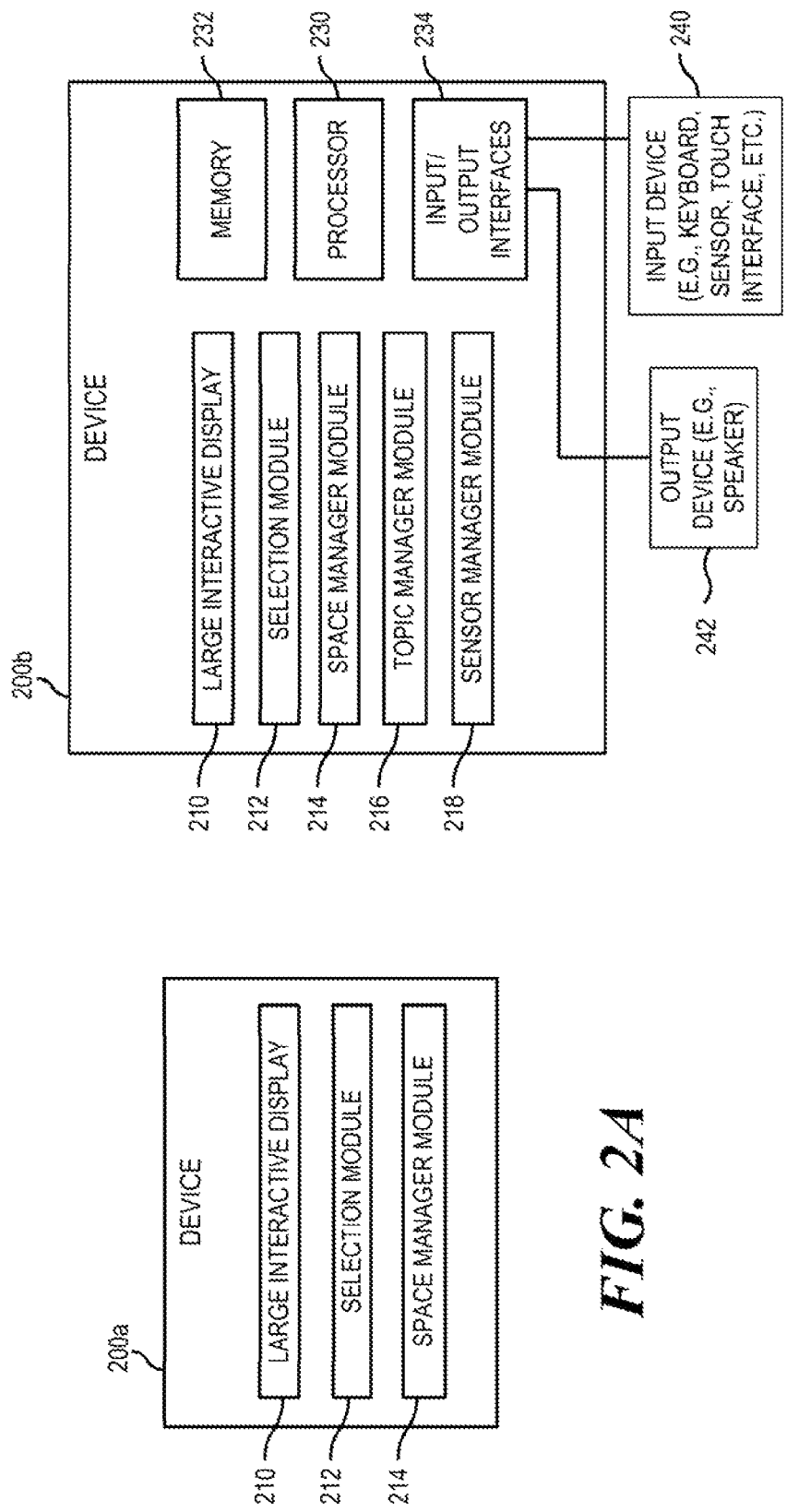
FIGS. 2A and 2B are block diagrams of devices with nodules to augment user interface elements, according to various examples.

FIGS. 2A and 2B are block diagrams of devices with modules to augment user interface elements, according to various examples. Devices 200a, 200b include modules that can be utilized to move user interface elements to generate free workspace for a user to access. The respective devices 200a, 200b may be a notebook computer, a tablet computing device, a portable reading, device, a wireless device, a large interactive device, a server, a smart wall, or any other device that may be utilized to present user interface elements. The devices 200a, 200b can include a display, such as a LID 210 to present information, such as generated content, to a user. The display can be connected via one or more interfaces (e.g., via a cable or a wireless medium). A processor, such as a CPU, a GPU, or a microprocessor suitable for retrieval and execution of instructions and/or electronic circuits configured to perform the functionality of any of the modules 212-218 described below. In some embodiments, the devices 200a, 200b can include some of the modules (e.g., modules 212-214), the modules (e.g., modules 212-218) shown in FIG. 2B, and/or additional components. Further, in certain embodiments, some modules can be utilized to implement functionality of other modules described below.

As detailed below, devices 200a, 200b may include a series of modules 212-218 for augmenting the location of user interface elements during use of one or more applications executing on the devices 200a, 200b. Each of the modules 212-218 may include, for example, hardware devices including electronic circuitry for implementing the functionality described below. In addition or as an alternative, each module may be implemented as a series of instructions encoded on a machine-readable storage medium of respective devices 200a, 200b and executable by a processor. It should be noted that, in some embodiments, some modules 212-218 are implemented as hardware devices, while other modules are implemented as executable instructions.

A display, such as a LID 210 can be utilized to present interfaces to users. Further, multiple displays can be supported. As previously noted, various types of technologies can be utilized to implement the display. For example, LIDs can include interactive projection displays (e.g., a display to a projection screen or wall), LCDs, cathode ray tube technology, plasma based displays, etc. Further, the LID 210 can be a single large display, multiple tiled smaller displays, can include multiple large displays, or the like.

A selection module 212 can be used to select a user interface element displayed on a region of interest of the LID 210. The selection can be based on a utilization of the user interface element. As previously noted, the user interface element can include multiple sub user interface elements. As such, utilization of the user interface element can include the utilization of any one of the sub user interface elements. A counter can be associated with the user interface element in a manner such that the counter is reset or partially reset each time the user interface element is utilized. When the counter reaches a certain threshold, the user interface element is selected. In certain scenarios, the user interface element grouping can occur when a counter that is associated with a region of interest associated with multiple sub user interface elements meets the threshold. Additionally or alternatively, the grouping can be triggered based on user input or a use of the LID 210 at another region of interest.

A space manager module 214 may be used to move the user interface element to another region of the LID 210. This more may be based on a time count of a utilization of the user interface element. For example, the user interface element may be moved to the other region as a function of the time count. The user interface element can be incrementally moved to the other region. This can create a visual effect of the user interface element slowly moving towards the other region. Further, the space manager module 214 can be utilized to provide an interface to modify placement of the user interface element and/or other user interface elements. For example, the space manager module 214 can utilize the LID 210 to present a control user interface element, such as a control bar, a wheel, etc. to modify the location of the user interface elements. In one scenario, the control bar can be utilized to manage time information associated with the display. When an earlier time on the time bar is selected, a user interface element in the region of interest at the selected previous time can be moved to its original location. In certain scenarios, the region of interest may have moved. In one of these scenarios, the user interface element at the previous region of interest can be moved to the current region of interest.

A topic manager module 216 can associate the user interface element with a topic. As noted above, the user interface element can be moved to another region. In certain scenarios, the other region is also associated with the topic. In one example, the topic includes a category to which the user interface element belongs. The category, including the topic can be associated with the other region. As such, as time flows, the user interface element moves towards the other region from its location.

Examples of ways to interact with a LID are via a touch mechanism, such as pointing via a finger, a pen or stylus mechanism, multi-touch enabled input, an audible input mechanism (e.g., voice), and a gesture mechanism. Various technologies can be utilized in implementation of the LID and devices associated with the LID.

A sensor manager module 218 gathers the information from a sensor or multiple sensors and provides the information (e.g., position information, orientation information, distance information from a reference point or sensor, etc.) to the selection module 212, space manager module 214, topic manager module 216, or other components of the device 200b. The sensor manager module 218 can utilize a processor 230 to store the information in a memory 232 that can be accessed by other modules of the device 200b. The processor 230 or multiple associated processors (not shown) can be a means for implementing additional functionality of the device 200b. Further, the sensor manager module 216 can utilize input/output interfaces 234 to obtain the sensor information from an input device 240.

In certain scenarios, an input device 240 can include a sensor, a keyboard, a mouse, a remote, a keypad, a microphone, or the like. Sensors can be used to implement various technologies, such as infrared technology, camera technology, touch screen technology, etc. Further, the device 200b may include devices utilized for input and output (not shown), such as a networking interface (e.g., Ethernet), a Universal Serial Bus (USB) connection, etc.

The input/output interfaces 234 can additionally be utilized to drive output to an output device 242. One of the modules 212-218, the processor 230, or another component of the device 200b can be utilized to send a signal via the input/output interfaces 234 to output devices 242. Examples of output devices include speakers, display devices, amplifiers, etc.

Figure 3:
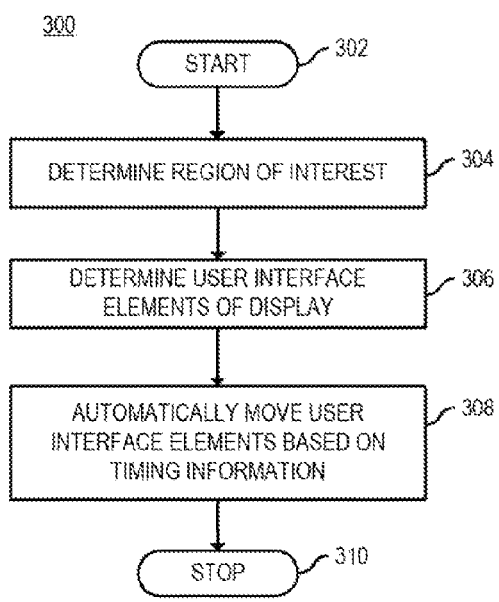
FIG. 3 is a flowchart of a method for moving user interface elements based on timing information, according to one example.

FIG. 3 is a flowchart of a method for moving user interface elements based on timing information, according to one example. Although execution of method 300 is described below with reference to computing device 100, other suitable components for execution of method 300 can be utilized (e.g., device 200a device 200b, etc.). Additionally, the components for executing the method 300 may be spread among multiple devices. Method 300 may be implemented in the form of executable instructions stored on a machine-readable storage medium, such as storage medium 120, and/or in the form of electronic circuitry.

Method 300 may start at 302 and proceed to 304, where computing device 100 may determine a region of interest of a LID. As noted above, the region of interest can be determined by associated input from a user and/or sensor information. The region of interest can be considered a location that is being currently used or recently used by the user. Further, the region of interest can be predefined. For example, the region of interest can be defined as a lower middle portion of the LID that is easily utilized by users.

At 306, the computing device 100 can determine one or more user interface elements displayed on the LID. The user interface elements can be determined in various ways. For example, the user interface elements can be identified based on when the user interface elements were created, utilized, loaded, etc. Further the user interface elements can be grouped together.

The user interface elements can then be automatically moved to another portion of the LID based on timing information (at 308). The timing information can be associated with a utilization of the user interface element(s). For example, a portion of the timing information can be associated with a last use, modification, or creation of the user interface element(s). Creation of the user interface element(s) can be considered a creation action. Then, as time moves on (e.g., determined via an increment of a time counter, determinations based on a clock, etc.) the user interface elements are moved. The movement can be with respect to the region of interest. For example, the movement can include moving the user interface elements away from the region of interest. With this activity, workspace in the region of interest is freed for the user.

Moreover, the user interface elements can be augmented based on the timing information. In one example, the user interface elements may be reduced in size as a function of the timing information. In another example, the user interface elements can be faded into a background layer as a function of the timing information. In yet another example, the resolution of the user interface elements can be reduced and/or the scaling of the user interface elements and/or sub user interface elements can be reduced. Further, combinations of augmentations can be performed on the user interface elements.

The timing information can additionally be used to control a movement of the user interface elements. For example, another user interface element can be provided that is capable of selecting a time associated with the timing information. The other user interface element can be shown as a scrolling bar, a wheel, or other control mechanism. A user can provide input and the processor 110 can receive input selecting a historic time since utilization. The time selection can be for example, a seek-bar input, a rewind input, a forward input, etc. When the input is provided, the user interface element can be moved to a historic location associated with the historic time since utilization. As such, the user interface elements are displayed closer to the region of interest as the selected time is closer to a utilization time associated with the last use of the user interface element(s). The last use can be determined and associated with the user interface element(s) before the user interface elements are moved or updated with additional last use information if the user interface elements are utilized after movement has begun. Then, at 310 the method 300 stops.

Figure 4:
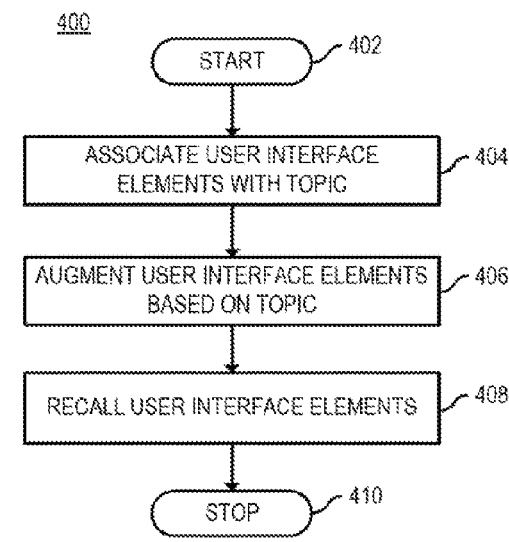
FIG. 4 is a flowchart of a method for augmenting user interface elements based on a topic, according to one example.

FIG. 4 is a flowchart of a method for augmenting user interface elements based on a topic, according to one example. Although execution of method 400 is described below with reference to device 200b, other suitable components for execution of method 400 can be utilized (e.g., computing device 100, device 200a). Additionally, the components for executing the method 400 may be spread among multiple devices. Method 400 may be implemented in the form of executable instructions stored on a machine-readable storage medium, such as storage medium 120, and/or in the form of electronic circuitry.

Method 400 may start at 402 and proceed to 404, where device 200 may associate one or more user interface elements with a topic. A topic can be a subject or category utilized to relate various user interface elements. The user interface elements can be associated via a data structure. A data structure associated with the user interface element(s) can include a field for the topic. Additionally or alternatively, a topic data structure can include a reference to the user interface element(s). For example, the data structure can include a list of associated user interface elements.

The user interface element(s) can be augmented based, at least in part, on the topic (at 406). For example, the augmentation of the user interface elements can include migrating the user interface elements towards other display elements associated with the topic. As such, the user interface elements can be incrementally moved to an area associated with the topic. The movement of the user interface elements to the topic area can be a useful organizational tool for users of the device 200. Further, in certain scenarios, the topic can be associated with recall functionality. With this approach, a recall trigger (e.g., a button, a gesture, an input, etc.) can be associated with the topic.

At 408, the device 200 recalls the user interface elements to a portion of the LID 210. The recall can be in response to execution of the recall trigger. Moreover, the recall may be utilized to display the user interface elements on a predetermined portion of the LID 210 or to a region of interest associated with a location of a user. The user interface elements can be retrieved from a memory 232 of the device 200. The memory 232 may be associated with a presentation of the user interface elements on the LID 210 or with a data structure that is partially displayed or not displayed. As such, during the association process, information associated with the user interface elements can be saved. Then, at 410, the method 400 stops.

Figure 5:
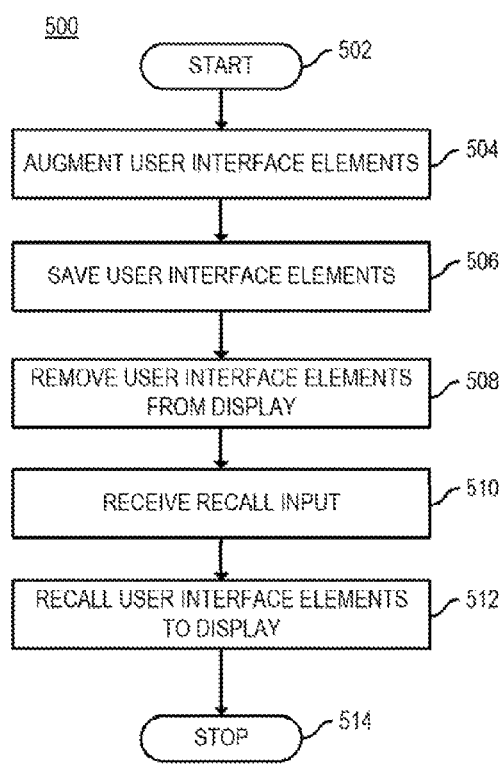
FIG. 5 is a flowchart of a method for recalling user interface elements, according to one example.

FIG. 5 is a flowchart of a method for recalling user interface elements, according to one example. Although execution of method 500 is described below with reference to device 200*b*, other suitable components for execution of method 500 can be utilized (e.g., computing device 100, device 200*a*). Additionally, the components for executing the method 500 may be spread among multiple devices. Method 500 may be implemented in the form of executable instructions stored on a machine-readable storage medium, such as storage medium 120, and/or in the form of electronic circuitry.

Method 500 may start at 502 and proceed to 504, where device 200 augments one or more user interface elements. As previously noted, the augmentation can occur as part of generating workspace on a LID 210 associated with the device 200. In addition to moving the user interface elements, the user interface elements can be saved (at 506). The saving can be caused by the processor 230 to store information associated with the user interface elements in the memory 232. The information can be in the form of data structures or files that can be utilized to generate another presentation of the user interface elements. Further, the saved information of the user interface elements can be associated with recall information. The recall information can include one or more triggers that can be utilized to cause display of the user interface elements at a portion of the LID 210. Further, the recall information may include an association with recall input that, when received, causes a recall. The saving can also be based, at least in part, on a determination that timing information associated with the user interface element(s) has met a threshold time. The threshold time can be a static time (e.g., after n minutes from utilization and/or creation) or can be a dynamic time (e.g., based on a formula or function that may include variables based on available space and/or user input).

At 508, the space manager module 214 can cause removal of the user interface elements from the LID 210. The removal of the user interface elements generates additional workspace on the LID 210. Because the user interface elements and/or associated information are saved, the user interface elements may be later recalled.

At 510, the device 200 receives a recall input. The recall input can be associated with the user interface elements to cause display of the user interface elements at a region of interest associated with the LID 210. In some scenarios, the user interface elements need not be removed from the display and may be recalled from another portion of the LID 210.

When the recall occurs, the user interface elements are moved to the region of interest (at 512). The region of interest may be a region where the user is working or another region of the LID 210. Further, regions of the LID 210 may be predetermined and/or labeled. Example such regions can include a top left portion of the LID 210, a bottom middle portion of the LID 210, a bottom right portion of the LID 210, etc. At 514, the method 500 stops.

Figure 6:
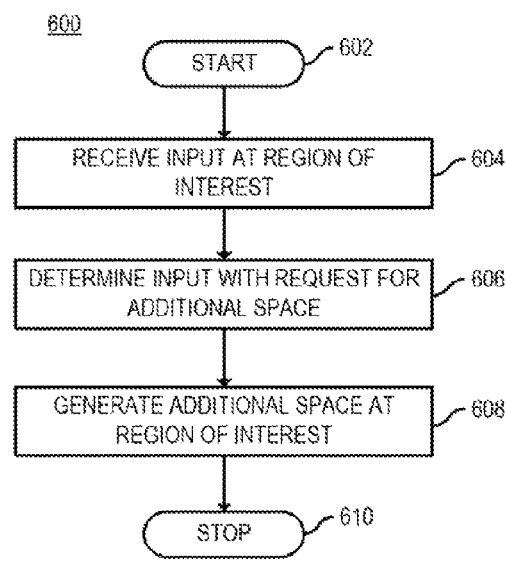
FIG. 6 is a flowchart of a method for generating workspace at a region of interest, according to one example.

FIG. 6 is a flowchart of a method for generating workspace at a region of interest, according to one example. Although execution of method 600 is described below with reference to device 200*b*, other suitable components for execution of method 600 can be utilized (e.g., computing device 100, device 200*a*). Additionally, the components for executing the method 600 may be spread among multiple devices. Method 600 may be implemented in the form of executable instructions stored on a machine-readable storage medium, such as storage medium 120, and/or in the form of electronic circuitry.

Method 600 may start at 602 and proceed to 604, where the device 200 receives input associated with a region of interest displayed on a LID 210. The input can be, for example, a touch based input, a gesture input, an audio input, or the like. Further, the input can be tied to an action to generate additional space at the region of interest.

At 606, the space manager module 214 determines that the user input is associated with a request for additional workspace. The determination can be based on a linking of the input to the request. Further, the linking can be associated with the region of interest. Then, at 608, the space manager module 214 generates additional workspace at the region of interest. The additional workspace may be created by storing the user interface elements in memory 232 and removing the user interface elements from the workspace. Moreover, the workspace can be generated by moving the user interface elements in the region to another region. Further, the generation of additional workspace can be implemented by accelerating the movement of the user interface elements to another region of the LID 210. The method 600 then proceeds to 610, where the method 600 stops.

FIGS. 7A-7H are block diagrams of example user interfaces for augmenting user interface elements, according to various examples. The user interfaces may be displayed on a LID. User interface 700 can be utilized by a user or multiple users using the LID. FIGS. 7A-7H are described with reference to a single user for explanatory purposes, however, it is contemplated that multiple users can utilize the LID. The user can utilize the user interface 700 to generate a whiteboard presentation 702. The whiteboard presentation 702 can include multiple user interface elements (e.g., drawings, text, lines, etc.) and/or be considered a user interface element.

Figure 7B:
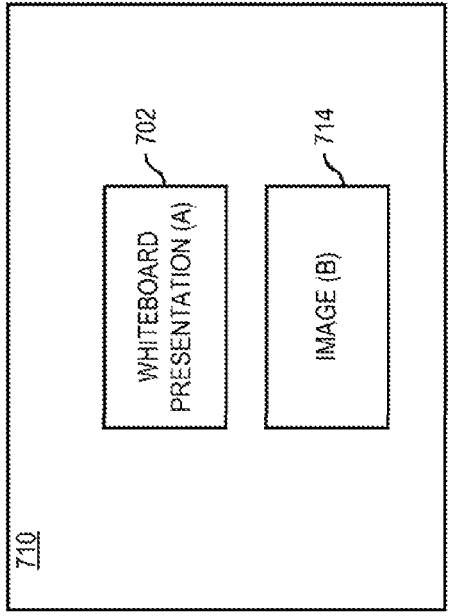

As time progresses, the user interface 700 is transformed into user interface 710 of FIG. 7B, where the whiteboard presentation 702 is moved to another location on the LID. To a user, the movement can look as if the whiteboard presentation 702 is slowly moved to the other location. The other location can be a predetermined location or a dynamic location based on a formula or function. Further, timing associated with the move can be based on such information. As the whiteboard presentation 702 is moved, the user can utilize the previously occupied region. In this example image 714 is created in the region previously occupied by the whiteboard presentation 702.

Figure 7D:
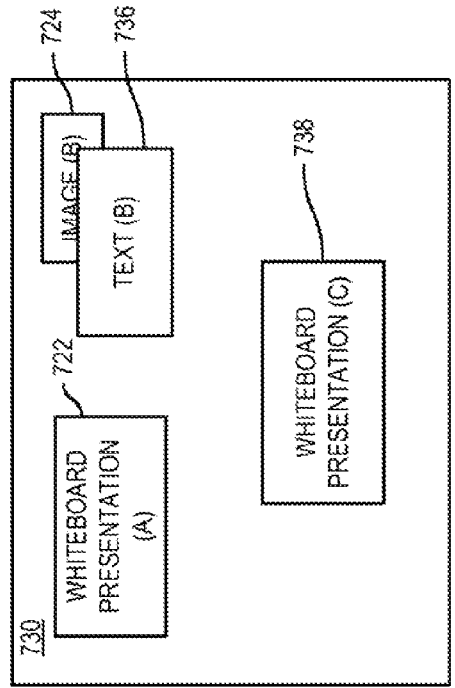
Figure 7A:
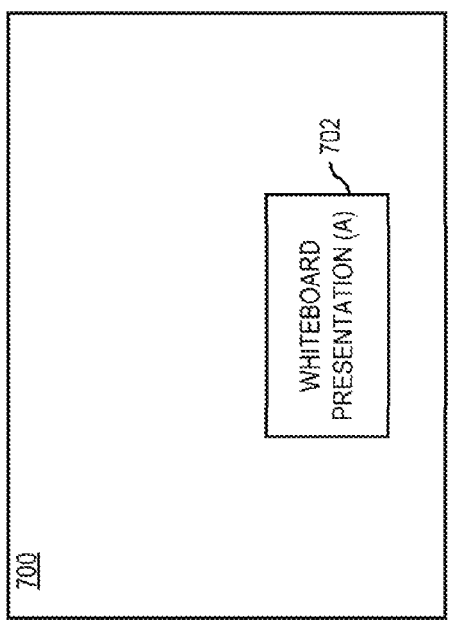
Figure 7C:
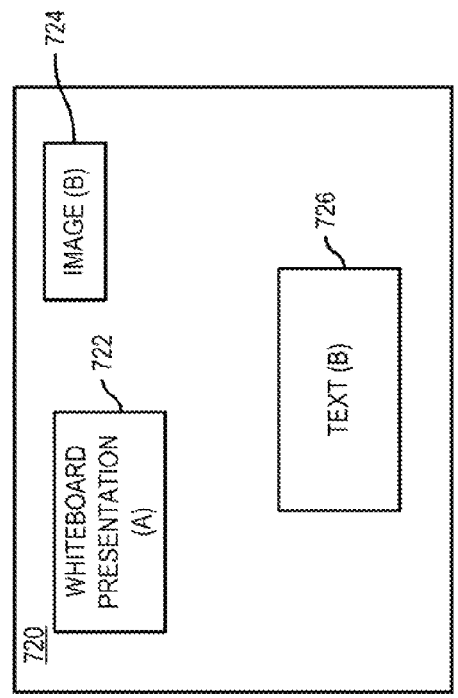

FIG. 7C displays user interface 720, which further augments the whiteboard presentation 722 and image 724. In user interface 720, the whiteboard presentation 722 is moved towards the top left corner of the user interface 720 to generate additional space for image 724 as well as additional workspace. The image 724 is also moved to generate the workspace. Moreover, the whiteboard presentation 722 and the image 724 are scaled down to increase the available workspace. The workspace can be used by the user for another user interface element, for example, for text 726.

FIG. 7D shows user interface 730, which generates additional workspace. In user interface 730, the whiteboard presentation 722 remains in the top left corner, while image 724 stays in the top right corner. The text 726 from FIG. 7C also moves to the top right corner. The moved text 736 can be moved in front of the image 724. Additionally or alternatively, the image 724 can be moved behind (e.g., into a background layer of rendering) the text 736 to allow for more space on the LID to be utilized. As such, another whiteboard presentation 738 can be generated for use by the user in the workspace.

Further, in FIG. 7D, the user interface elements can be grouped. Whiteboard presentation 722 can be in group A while user interface elements 724 and 736 are in group B and whiteboard presentation 738 is in group C. As such, when the user interface elements are moved or augmented, the user interface elements can be organized based on the groups. As shown in user interface 740 of FIG. 7E, whiteboard presentation 748 can be moved to the bottom right of the user interface 740. As such, whiteboard presentation 748 is part of a separate group than whiteboard presentation 722, image 724, and text 736. Further, the whiteboard presentation 748 may be moved into a background layer to generate space for whiteboard presentation 749. Whiteboard presentation 749 may additionally be associated with another group.

FIG. 7F shows a user interface 750 that can occur when a user input is utilized to generate additional space. For example, a touch input 751 (e.g., a tap or touch motion) can be utilized as a request or trigger for more workspace. As such, the user interface elements 722, 724, 736, 748, 749 can be moved to locations on the user interface 750 that allow for the space in a region of the user interface 750 corresponding to the input. This movement can be an acceleration of a movement of the user interface element as a function of time.

FIG. 7G shows a user interface 760 where a group of user interface elements 724, 736 are recalled. In this example, the other user interface elements 722, 748, 749 are moved to other locations (e.g., locations away from a region of interest) of the user interface 760 to allow for the display of the user interface elements 724, 736 in the region of interest. The region can be determined based on information from the input (e.g., based on a touch), based on sensors, etc.

As shown in FIG. 7H, user interface 770 displays a control element 772 that may be utilized to modify the location of user interface elements based on a flow of time. In this example, the control element 772 is a time bar. The control element 772 can be displayed in response to an input or can be displayed as an option during use of the user interface 770. In this scenario, the time is moved backwards to a time where whiteboard presentation 702 and image 714 were displayed. The user interface 770 can be moved forward or backward to other views. Moreover, the user interface elements and/or underlying information associated with the user interface elements can be saved in memory for later use and/or for the other views.

With the above approaches, user interface elements on one or more LIDs can be augmented to generate workspace for a user. In this manner, the user is able to quickly and efficiently utilize space on the LID. User interface elements can be slowly augmented to generate the space without disturbing the use of the user. As such, users are able to utilize the LID without need to erase content or save and distribute content before continuing with use of the LID. Further, the recall abilities can be utilized to highlight user interface elements via an organization based on topics.

What is claimed is:

1. A method comprising:
    determining a region of interest of an interactive display based on a usage of the interactive display;
    determining a time since utilization of a user interface element displayed on the interactive display exceeds a threshold;
    determining timing information for content in a region of the interactive display other than the region of interest, wherein the timing information is based on utilization of the content;
    determining the content is stale based on the timing information exceeding a threshold time;
    removing the content from the interactive display based on the content being stale;
    automatically moving the user interface element progressively over a period of time from an initial location to the region other than the region of interest;
    providing another user interface element capable of selecting a previous time since utilization of the user interface element;
    receiving input selecting the previous time since utilization of the user interface element; and
    moving the user interface element to a historic location associated with the previous time since utilization of the user interface element.

2. The method of claim 1, wherein the user interface element is augmented based on the time since utilization.

3. The method of claim 2, wherein the augmentation includes: reducing a size of the user interface element as a function of the time since utilization, fading the user interface element as a function of the time since utilization, or a combination thereof.

4. The method of claim 2, further comprising:
    associating the user interface element with a topic,
    wherein the augmentation of the user interface element includes migrating the user interface element towards other user interface elements associated with the topic.

5. The method of claim 1, further comprising:
    saving the user interface element based on a determination that the time since utilization has met a threshold time; and
    removing the user interface element from the interactive display.

6. The method of claim 1, further comprising:
    receiving a user input associated with the region of interest;
    determining that the user input corresponds to a request for additional workspace; and
    generating the additional workspace at the region of interest.

7. The method of claim 1, wherein the utilization corresponds to a creation action of the user interface element.

8. The method of claim 1, further comprising:
    associating recall information with the user interface element;
    receiving an input to recall the user interface element to another region of interest associated with the interactive display; and
    moving the user interface element to the other region of interest.

9. A device comprising:
    an interactive display;
    a selection module to:
        determine a region of interest on the interactive display based on a usage of the interactive display, and
        select a user interface element displayed in the region of interest;
    a space manager module to:
        determine a time since utilization of the user interface element exceeds a threshold,
        determine timing information for content in a region of the interactive display other than the region of interest, wherein the timing information is based on utilization of the content,
        determine the content is stale based on the timing information exceeding a threshold time,
        remove the content from the interactive display based on the content being stale, automatically move the user interface element progressively over a period of time from an initial location to the region other than the region of interest; and a history module to:
provide another user interface element capable of selecting a previous time since utilization of the user interface element,
receive a user input selecting the previous time since utilization of the user interface element, and
move the user interface element to a historic location associated with the previous time since utilization of the user interface element.

10. The device of claim 9, further comprising:
a topic manager module to associate the user interface element with a topic, wherein the other region is associated with the topic.

11. The device of claim 9, wherein the user interface element is incrementally moved to the other region as a function of the time count.

12. A non-transitory computer-readable storage medium storing instructions that, if executed by at least one processor of a device, cause the at least one processor to:
determine a region of interest of an interactive display based on a usage of the interactive display;
determine a time since utilization of a user interface element displayed on the interactive display exceeds a threshold;
determine timing information for content in a region of the interactive display other than the region of interest, wherein the timing information is based on utilization of the content;
determine the content is stale based on the timing information exceeding a threshold time;
remove the content from the interactive display based on the content being stale;
automatically move the user interface element progressively over a period of time from an initial location to the region other than the region of interest;
provide another user interface element capable of selecting a previous time since utilization of the user interface element;
receive input selecting the previous time since utilization of the user interface element; and
move the user interface element to a historic location associated with the previous time since utilization of the user interface element.

13. The non-transitory computer-readable storage medium of claim 12,
wherein the user interface element includes generated content, and
wherein the moving further includes fading the user interface element to a background layer of the interactive display.

14. The non-transitory computer-readable storage medium of claim 13, wherein the selection of a previous time since utilization comprises a gesture.

* * * * *